US008935832B2

(12) United States Patent
Chuang

(10) Patent No.: US 8,935,832 B2

(45) Date of Patent: Jan. 20, 2015

(54) STRUCTURE TO SECURE CURTAIN ROPE

(75) Inventor: Shan-Chi Chuang, New Taipei (TW)

(73) Assignee: Syn Yao Enterprise Co. Ltd., New Taipei (TW)

( * ) Notice: Subject to any disclaimer, the term of this patent is extended or adjusted under 35 U.S.C. 154(b) by 321 days.

(21) Appl. No.: 13/439,446

(22) Filed: Apr. 4, 2012

(65) Prior Publication Data

US 2013/0264435 A1 Oct. 10, 2013

(51) Int. Cl.

| | |
|---|---|
| ***F16G 11/00*** | (2006.01) |
| ***F16G 11/04*** | (2006.01) |
| ***F16G 11/10*** | (2006.01) |

(52) U.S. Cl.

USPC .... 24/115 G; 24/115 R; 24/129 R; 24/132 R; 24/135 N; 248/261; 248/262; 160/178.2

(58) Field of Classification Search

USPC ................. 248/251, 261-273, 323, 328, 329; 160/178.2, 320, 321, 345; 24/115 G, 24/115 R, 129 R, 132 R, 132 N

See application file for complete search history.

(56) References Cited

U.S. PATENT DOCUMENTS

| | | | | |
|---|---|---|---|---|
| 387,499 | A * | 8/1888 | Earnshaw | 24/136 R |
| 407,592 | A * | 7/1889 | Harkness | 24/134 KB |
| 4,635,698 | A * | 1/1987 | Anderson | 160/178.2 |
| 5,752,558 | A * | 5/1998 | Lin | 160/320 |
| 6,672,237 | B2 * | 1/2004 | Hillier | 114/230.2 |
| 6,823,926 | B1 * | 11/2004 | Tyner | 160/178.2 |
| 7,237,307 | B2 * | 7/2007 | Feschuk | 24/115 R |
| 7,490,387 | B2 * | 2/2009 | Hillier | 24/136 R |
| 8,104,146 | B2 * | 1/2012 | Wen | 24/115 F |
| 8,181,312 | B2 * | 5/2012 | Attinger et al. | 24/136 R |
| 8,539,645 | B2 * | 9/2013 | Marocco | 24/136 K |
| 8,650,720 | B2 * | 2/2014 | Wicker et al. | 24/115 G |
| 2008/0185110 | A1 * | 8/2008 | Nien et al. | 160/178.2 |
| 2008/0196213 | A1 * | 8/2008 | Lin | 24/115 F |
| 2010/0230572 | A1 * | 9/2010 | Laughlin | 248/328 |

* cited by examiner

*Primary Examiner* — Terrell McKinnon
*Assistant Examiner* — Michael McDuffie
(74) *Attorney, Agent, or Firm* — Che-Yang Chen; Law Office of Michael Chen

(57) ABSTRACT

A structure to secure a curtain rope includes a base and an engaging body. The bases engages with the engaging body to secure the curtain rope, and a securing unit is provided to secure the structure to a wall surface, so that the curtain rope is restricted to the wall by the securing unit, which increases the convenience for the user to control the curtain rope, and prevents small children from being tripped over and strangulation accidents.

5 Claims, 8 Drawing Sheets

STRUCTURE TO SECURE CURTAIN ROPE

FIELD OF THE INVENTION

The present invention relates to a securing structure, and more particularly to a structure to secure a curtain rope.

BACKGROUND OF THE INVENTION

In modern living room, curtains are mainly used as shade and protection of privacy, as well as decorations, increasing aesthetics values of the living room, and showing the taste of the homeowner. However, in order to facilitate the commencement and retraction of curtain blades, a rope is usually provided to control the rise and fall of the curtain leaves. But, the rope of may be easy to sway due to wind, which may affect the interior of the living room, often cause entanglement and knotted, and adversely affect the normal operation of the curtain. Moreover, the curtain rope is often made by stiff rope or chain. If young children play with the curtain rope, a strangulation accident may result, which increases the risk and disadvantage of using the curtain rope. Therefore, there remains a need for an improved and new structure to secure the curtain rope.

SUMMARY OF THE INVENTION

Conventionally, in order to facilitate the commencement and retraction of curtain blades, a rope is usually provided to control the rise and fall of the curtain leaves. But, the rope of may be easy to sway due to wind, which may affect the interior of the living room, often cause entanglement and knotted, and adversely affect the normal operation of the curtain. Moreover, the curtain rope is often made by stiff rope or chain. If young children play with the curtain rope, a strangulation accident may result, which increases the risk and disadvantage of using the curtain rope. Therefore, there remains a need for an improved and new structure to secure the curtain rope.

To solve and overcome the problems stated above, the present invention provides a structure to secure a curtain rope including a base and an engaging body. The base has a U-shaped outer frame at its outer portion, and a protruding rib is formed on an upper portion of the outer frame. Both sides of the protruding rib and the outer frame are not connected, and a horizontal channel is disposed therebetween, so that the curtain rope can be disposed therein. A positioning groove is formed at each side of the outer frame, and the protruding rib has an engaging slot on an upper surface thereof. The base is empty inside and a passive post extends upwards from a bottom portion of the base, and the passive post is slightly slanted toward outside, and a protruding block and a through hole are formed at the center of the passive post. A clamping portion on an upper portion is located between the horizontal channels. The engaging body engages with the base, and two latches on both sides of the engaging body are corresponding to the positioning groove of the base, and a connecting groove is formed on an upper portion of the engaging body corresponding to the protruding rib, and an engaging latch extends therefrom. A through opening is formed on the surface of the engaging body corresponding to the protruding block, and a clamping protruding portion is formed corresponding to the through opening, connecting groove, and the horizontal channels of the base. According to the structure described above, a structure to secure curtain rope is formed.

Comparing with the conventional arts, the present invention is a structure to secure curtain rope, so the curtain rope can be fixed and restricted to the wall surface to avoid entanglement of the rope to increase the convenience of the rope movement. More importantly, it can prevent small children from being tripped over and strangulation accidents.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
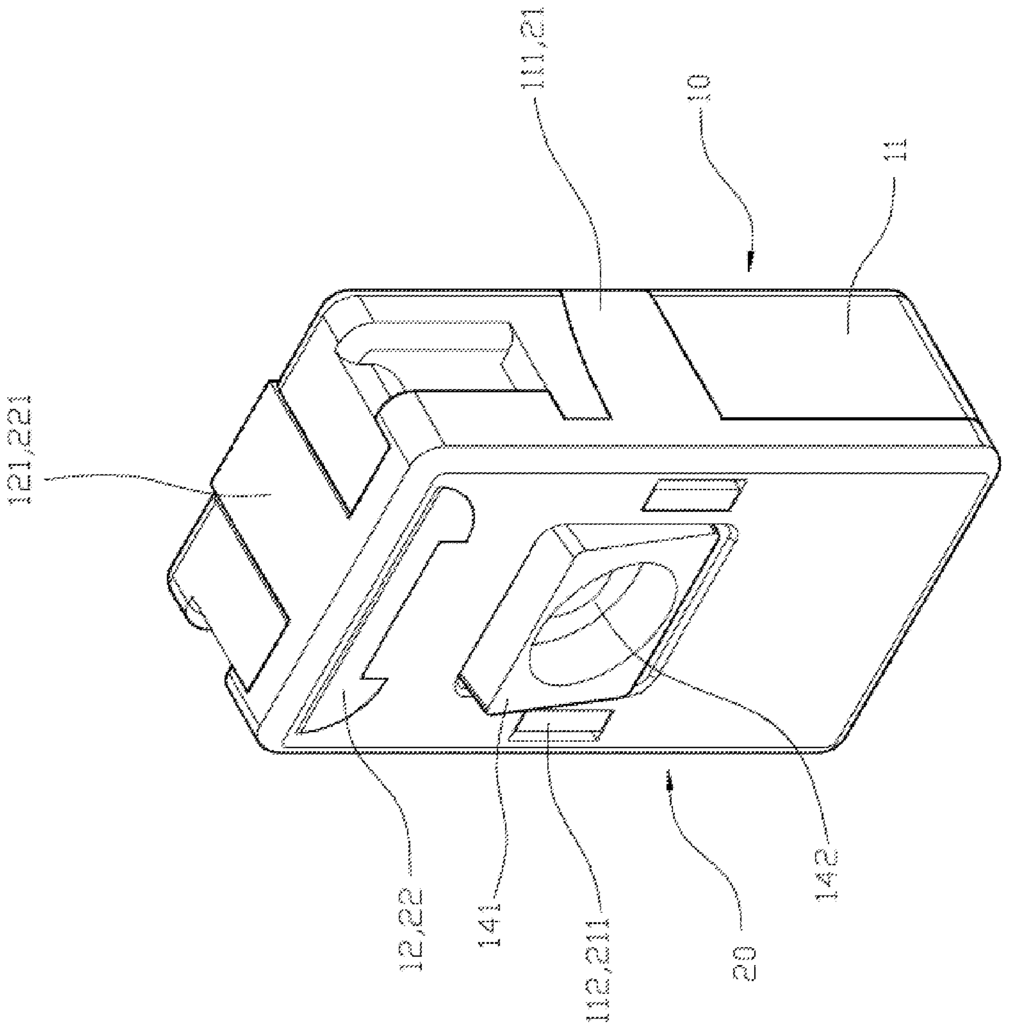
FIG. 1 illustrates a three-dimensional view in the present invention.
Figure 2:
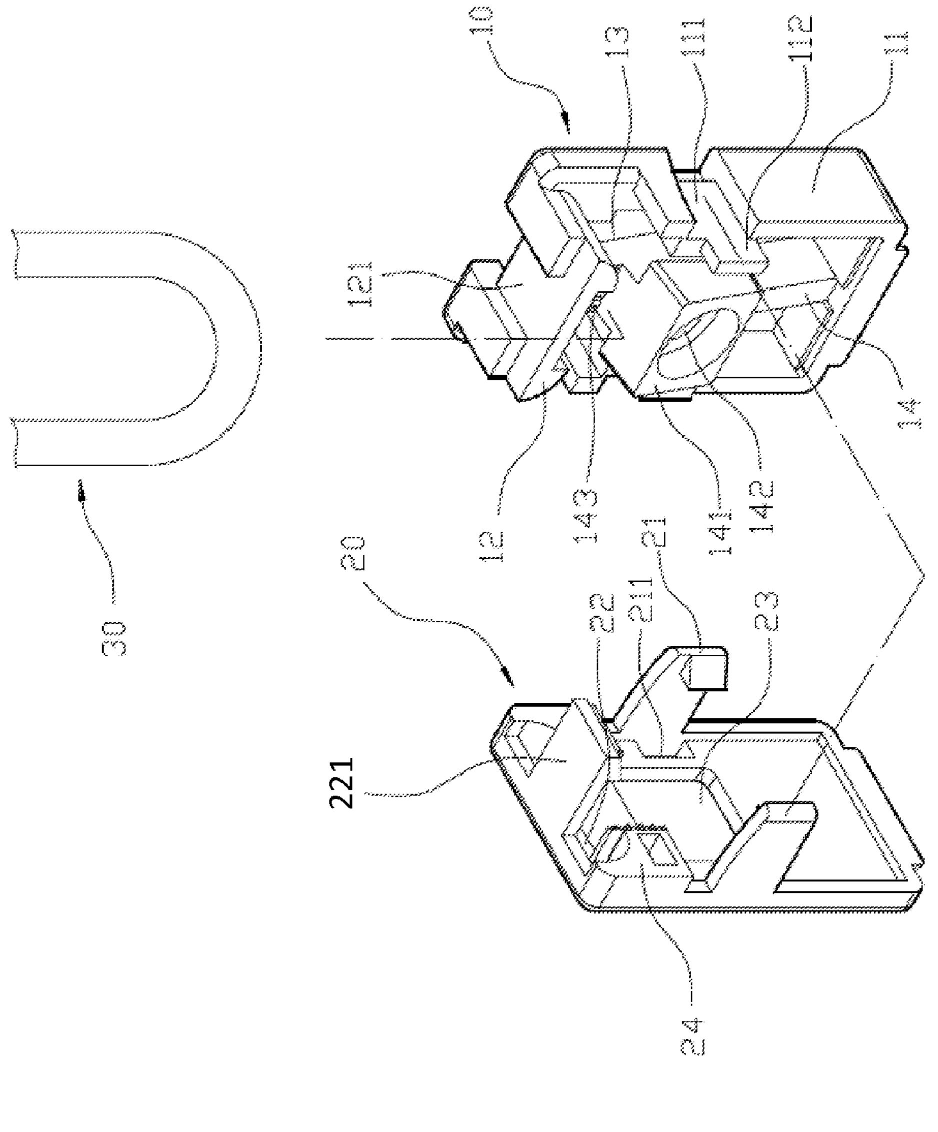
FIG. 2 illustrates a three-dimensional exploded view in the present invention.
Figure 3:
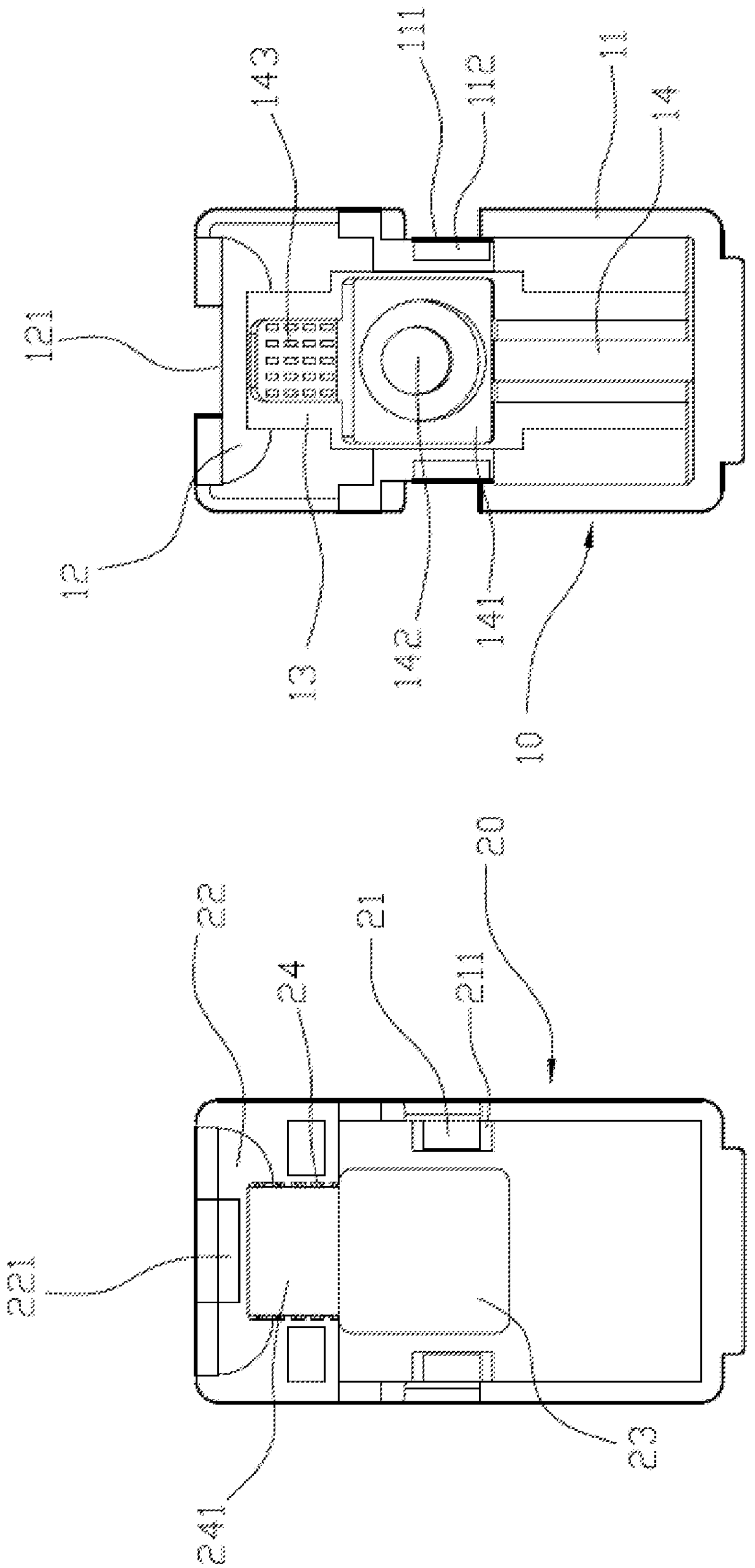
FIG. 3 illustrates a two-dimensional front view in the present invention.

In order to further understand the goal, characteristics and effect of the present invention, a number of embodiments along with the drawings are illustrated as following:

Referring to FIGS. 1, 2 and 3, a structure to secure a curtain rope includes a base (10) and an engaging body (20). The base (10) has a U-shaped outer frame (11) at its outer portion, and a protruding rib (12) is formed on an upper portion of the outer frame (11). Both sides of the protruding rib (12) and the outer frame (11) are not connected, and a horizontal channel (13) is disposed therebetween. A positioning groove (111) is formed at each side of the outer frame (11), and the positioning groove (111) extends to form a connecting rib (112), and the protruding rib (12) has an engaging slot (121) on an upper surface thereof. The base (10) is empty inside and a passive post (14) extends upwards from a bottom portion of the base (10), and the passive post (14) is slightly slanted toward outside, and a protruding block (141) and a through hole (142) are formed at the center of the passive post (14). A clamping portion (143) on an upper portion is located between the horizontal channels (13), and the surface of the clamping portion is jagged. The engaging body (20) engages with the base (10), and two latches (21) on both sides of the engaging body (20) are corresponding to the positioning groove (111) of the base (10), and a connecting through hole (211) is located on the surface of the latches (21). A connecting groove (22) is formed on an upper portion of the engaging body (20) corresponding to the protruding rib (12), and an engaging latch (221) extends therefrom. A through opening (23) is formed on the surface of the engaging body (20) corresponding to the protruding block (141), and a clamping protruding portion (24) is formed corresponding to the through opening (23), connecting groove (22) and the horizontal channels (13) of the base (10). The surface of the clamping protruding portion is jagged, and an evading slot (241) is formed at the center of the clamping protruding portion (24) corresponding to the clamping portion (143) of the passive post (14). A structure to secure curtain rope is completed as described above.

Figure 4:
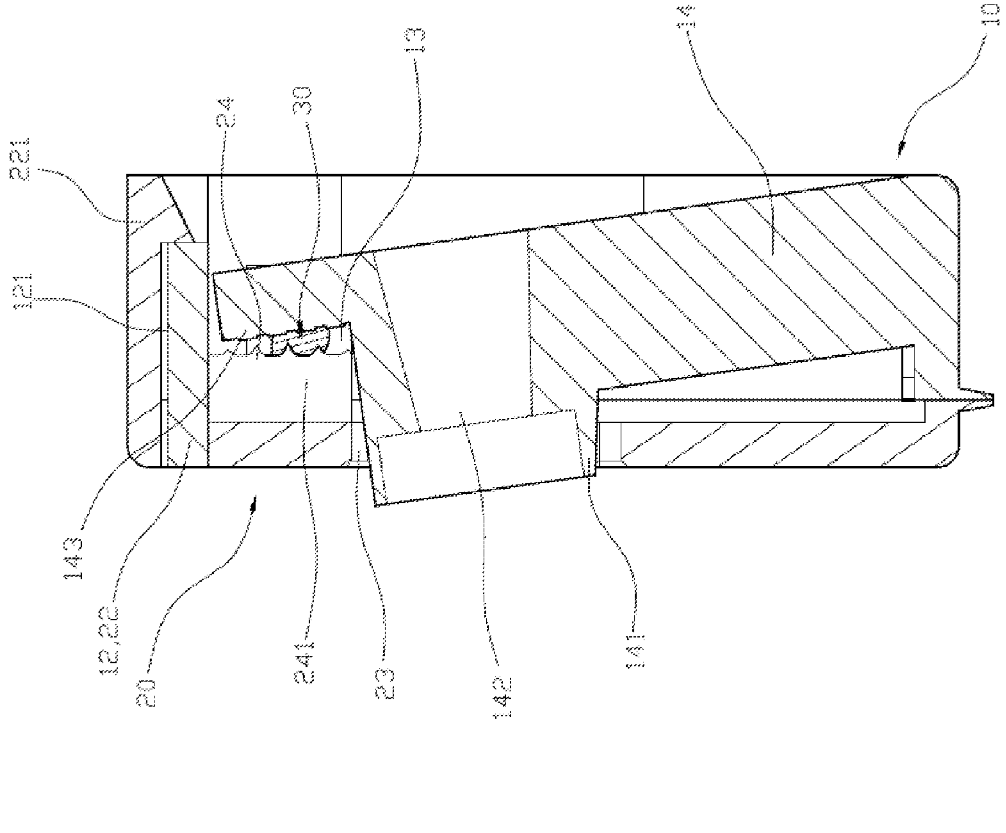
FIG. 4 illustrates a sectional view in the present invention.
Figure 5:
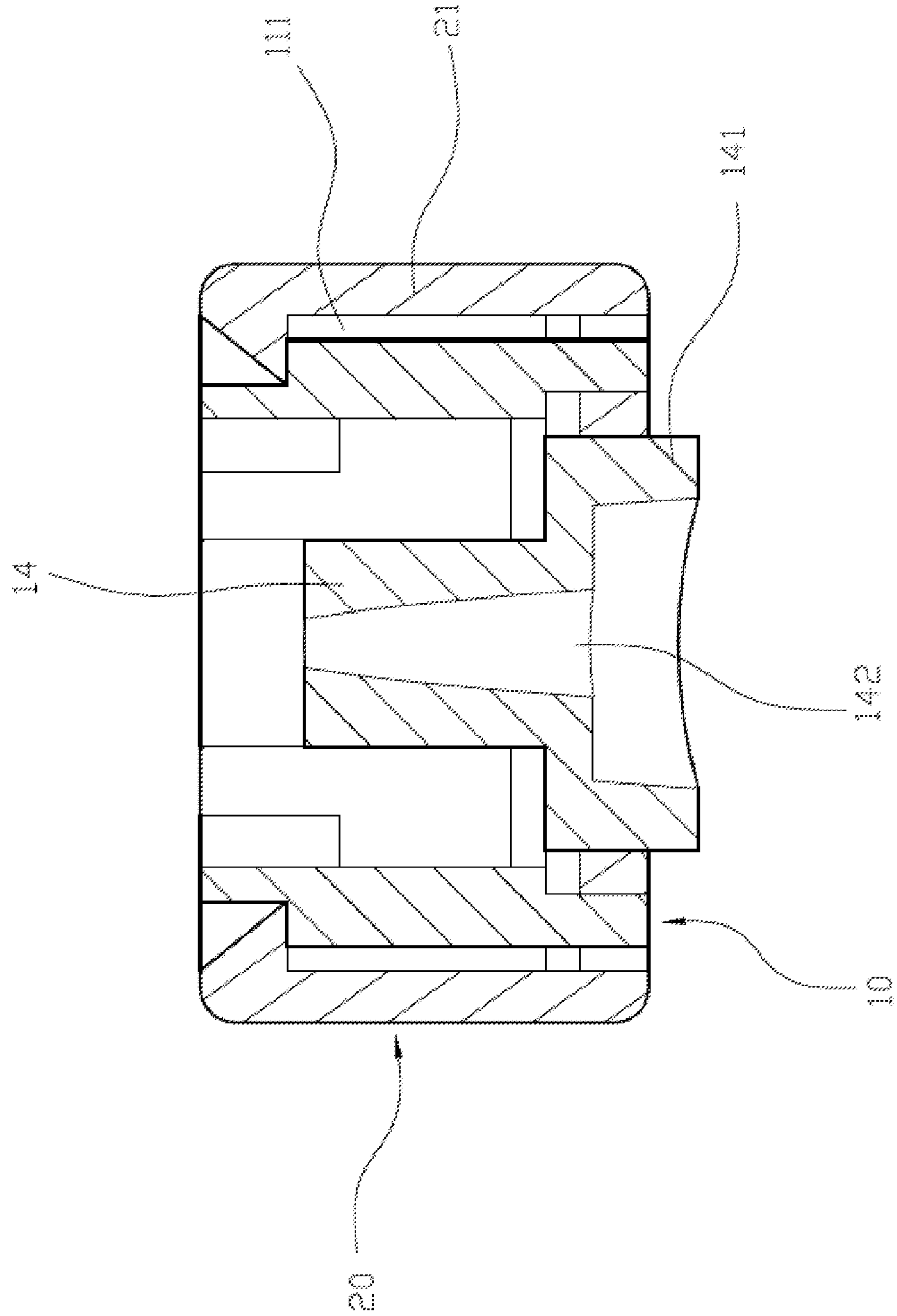
FIG. 5 illustrates a sectional view from another angle in the present invention.
Figure 6:
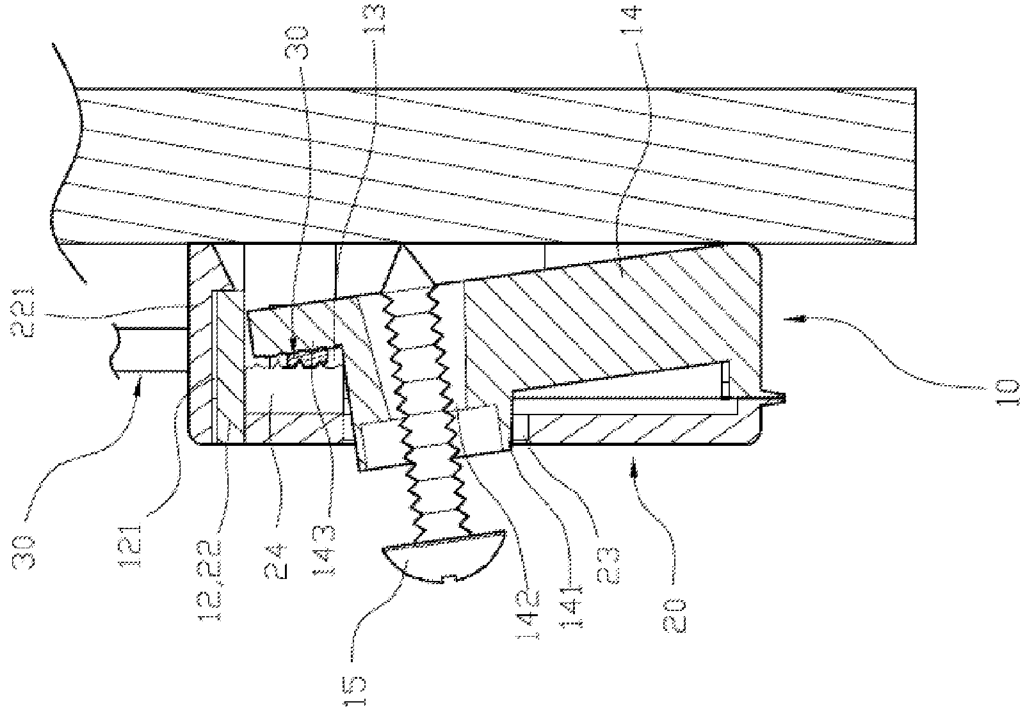
FIG. 6 illustrates a schematic view of one embodiment of securing the rope on the wall surface in the present invention.
Figure 7:
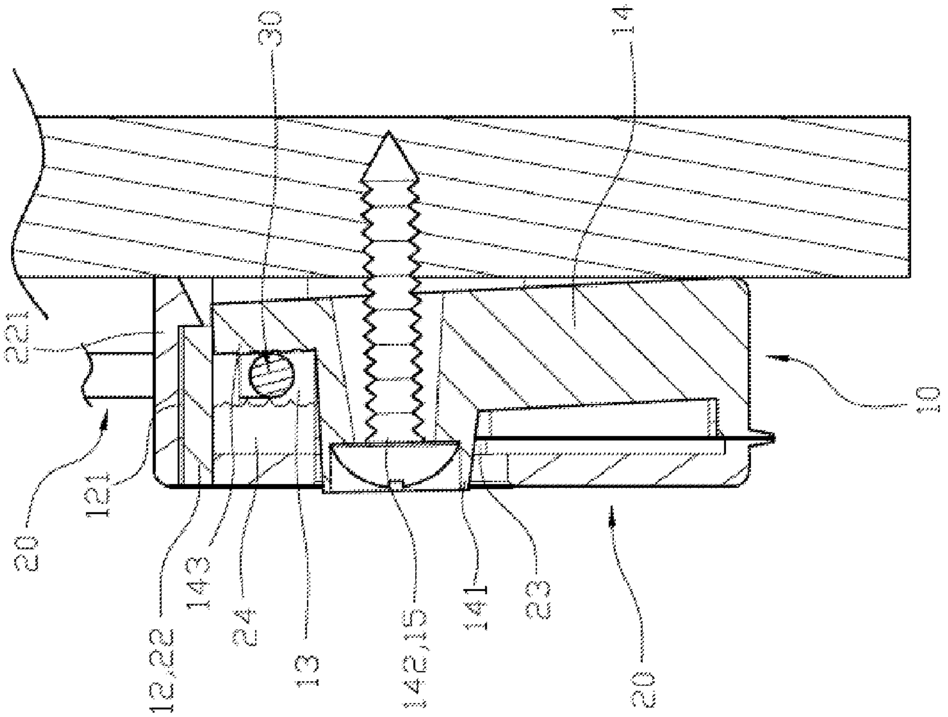
FIG. 7 illustrates a schematic view of another embodiment of securing the rope on the wall surface in the present invention.
Figure 8:
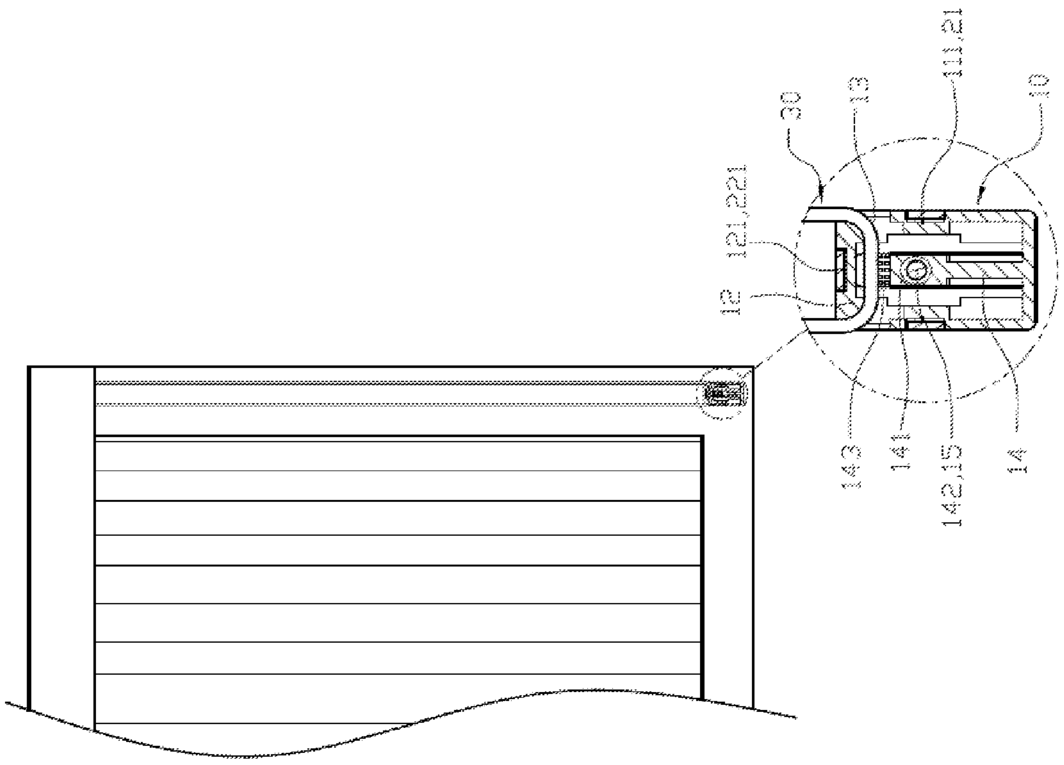
FIG. 8 illustrates a schematic view of practical usage in the present invention.

Referring to FIGS. 4 and 5 for the structure in the present invention, the base (10) engages with the engaging body (20) to secure the curtain rope (30) on the wall surface. When assembling the structure, the curtain rope (30) is disposed in the horizontal channels (13) of the base (10), passing through the clamping portion (143) of the passive post (14). The engaging body (20) and the base (10) are then engaged through the latches (21) on both sides of the engaging body (20) and the positioning groove (111), so that the connecting rib (112) of the base (10) can pass through the connecting through hole (211) to form a secured positioning. The connecting groove (22) at the upper portion engages with the protruding rib (12) of the base (10) to form a restricted positioning, and the engaging latch (221) engages with the engaging slot (121), such that the clamping protruding portion (24) of the engaging body (20) is disposed within the horizontal channels (13) of the base (10) to secure the curtain rope (30) through the clamping portion (143) of the passive post (14), as well as the engaging body (20) and the base (10). More specifically, the rope (30) is secure by the engagement of the clamping portion (143) of the passive post (14) and the clamping protruding portion (24) of the engaging body (20). The protruding block (141) of the passive post (14) is protruding from the through opening (23) of the engaging body (20), and a securing unit (15) is provided at the through hole (142) to form a secured positioning with the wall surface (see FIGS. 6, 7 and 8). The securing unit (15) is fixed on the wall surface through the screw, and when the securing unit (15) is gradually screwed into the wall, the passive post (14) is moved toward the direction of the wall surface, so the rope (30) is pulled when the clamping portion (143) moves away, and the rope (30) can be fixed and restricted to the wall surface, and the user can control the curtain through the movement of the rope (30).

According to the embodiments discussed above, the present invention is a structure to secure curtain rope, so the curtain rope (30) can be fixed and restricted to the wall surface to avoid entanglement of the rope (30) to increase the convenience of the rope (30) movement. More importantly, it can prevent small children from being tripped over and strangulation accidents.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A structure to secure a curtain rope comprising:

a base having a U-shaped outer frame at its outer portion, and a protruding rib formed on an upper portion of the outer frame, wherein both sides of the protruding rib and the outer frame are not connected, and a horizontal channel is disposed therebetween, so that the curtain rope is disposed therein, wherein a positioning groove is formed at each side of the outer frame, and the protruding rib has an engaging slot on an upper surface thereof, wherein the base is empty inside and a passive post extends upwards from a bottom portion of the base, and the passive post is slightly slanted towards the outside, and a protruding block and a through hole are formed at the center of the passive post, wherein a clamping portion on an upper portion is located between the horizontal channels; and an engaging body engaging with the base, two latches on both sides of the engaging body corresponding to the positioning groove of the base, a connecting groove formed on an upper portion of the engaging body corresponding to the protruding rib, and an engaging latch extending therefrom, wherein a through opening is formed on the surface of the engaging body corresponding to the protruding block, and a clamping protruding portion is formed corresponding to the through opening, connecting groove, and the horizontal channels of the base.

2. The structure to secure a curtain rope of claim 1, wherein the positioning groove extends to form a connecting rib, and a connecting through hole is located on surface of the latches.

3. The structure to secure a curtain rope of claim 1, wherein an evading slot is formed at a center of the clamping protruding portion corresponding to the clamping portion of the passive post.

4. The structure to secure a curtain rope of claim 1, wherein a securing unit is provided at the through hole.

5. The structure to secure a curtain rope of claim 1, wherein surfaces of the clamping portion and clamping protruding portion are jagged.

* * * * *